United States Patent
Zinn

(10) Patent No.: US 8,359,011 B2
(45) Date of Patent: Jan. 22, 2013

(54) NON-VISUAL INBOX SUMMARY FOR MOBILE COMMUNICATION DEVICES

(75) Inventor: Ronald Scotte Zinn, Waterloo (CA)

(73) Assignee: Research In Motion Limited, Waterloo (CA)

(*) Notice: Subject to any disclaimer, the term of this patent is extended or adjusted under 35 U.S.C. 154(b) by 732 days.

(21) Appl. No.: 11/675,136

(22) Filed: Feb. 15, 2007

(65) Prior Publication Data
US 2008/0200149 A1   Aug. 21, 2008

(51) Int. Cl.
H04M 1/725    (2006.01)

(52) U.S. Cl. .......... 455/412.1; 455/412.2; 455/418; 455/466

(58) Field of Classification Search .......... 455/412.1, 455/412.2, 413, 414.4, 414.1, 550.1, 552.1, 455/556.1, 556.2, 557, 575.1–575.8, 90.3, 455/459, 466, 553.1, 566, 567, 575.1–575.8, 455/418–422.1, 5, 67; 709/206, 207, 204; 379/93.01, 93.18; 370/310.2, 328, 338, 352–356
See application file for complete search history.

(56) References Cited

U.S. PATENT DOCUMENTS

| | | | |
|---|---|---|---|
| 6,181,956 B1 | 1/2001 | Koskan | |
| 6,212,408 B1 * | 4/2001 | Son et al. | 455/563 |
| 6,311,076 B1 * | 10/2001 | Peuhu et al. | 455/566 |
| 6,408,191 B1 * | 6/2002 | Blanchard et al. | 455/566 |
| 6,892,081 B1 * | 5/2005 | Elomaa | 455/575.1 |
| 6,895,257 B2 * | 5/2005 | Boman et al. | 455/556.1 |
| 6,983,169 B2 * | 1/2006 | Vogel et al. | 455/550.1 |
| 7,363,060 B2 * | 4/2008 | Bernhart et al. | 455/567 |
| 2002/0098831 A1 * | 7/2002 | Castell et al. | 455/413 |
| 2005/0108338 A1 * | 5/2005 | Simske et al. | 709/206 |

FOREIGN PATENT DOCUMENTS

| | | |
|---|---|---|
| WO | 2004071113 A | 8/2004 |
| WO | 2006085171 A | 8/2006 |

OTHER PUBLICATIONS

Jabra BT8010's user manual, 2006.*

* cited by examiner

Primary Examiner — Jinsong Hu
Assistant Examiner — San Htun
(74) Attorney, Agent, or Firm — Jenna L. Wilson; Dimock Stratton LLP

(57) ABSTRACT

A mobile communication device is operable to receive and store messages in a defined message inbox. A user input device is provided to permit a user of the device to make a message inbox status query. In answer to the query, the device provides a non-visual response communicating one or more characteristics of the message inbox. Such characteristics are definable and the method of providing a non-visual response communication is configurable. The non-visual response potentially includes an auditory communication that is provided in response to a query made using an easy to access button located on the device.

29 Claims, 3 Drawing Sheets

NON-VISUAL INBOX SUMMARY FOR MOBILE COMMUNICATION DEVICES

TECHNICAL FIELD

The invention relates to wireless communications. In particular, the invention relates to a method of communicating a summary of the contents of an inbox in a communications device to a user.

TECHNICAL BACKGROUND

With the advent of mobile personal communication devices capable of receiving messages having different formats, it has been found desirable to include a visual interface to summarize the messages the user has received in each format. Typical wireless mobile communication devices are capable of receiving both voice and text messages in a variety of formats including phone calls, forwarded voice messages, email, SMS (Short Messaging Service) and other text message formats.

Messages received by the device are notionally collected in a message inbox until the user operates the device to delete or move the message to a storage location. When a user wishes to determine whether there are any new messages of interest listed in the message inbox for review, the user must visually check the mobile communication device's visual display. While a visual interface has proven to be a useful way to summarize the received messages to the user, such an interface requires the user to direct his or her attention to the interface to determine the contents of the inbox. This can be distracting to the user, or to others, in situations where the user's visual focus is required elsewhere such as driving, walking on a busy street or attending a meeting.

Since mobile communication devices are often worn in a holster or carrying case, viewing the visual interface typically requires removing the device from the holster or case to view the inbox summary display. Thus, while visual review of the contents of the inbox is efficient, the act of removing the device in order to view the display is potentially awkward or inefficient. Further, for devices with wireless headsets, the device is often carried in an inside pocket, a hand bag or briefcase.

It is therefore desirable to provide a system and method for allowing a user to review the contents of a message inbox on a mobile communication device without having to access the device to view the display.

BRIEF DESCRIPTION OF THE DRAWINGS

In drawings which illustrate by way of example only a preferred embodiment of the invention.

DESCRIPTION OF THE PREFERRED EMBODIMENT

Figure 1:
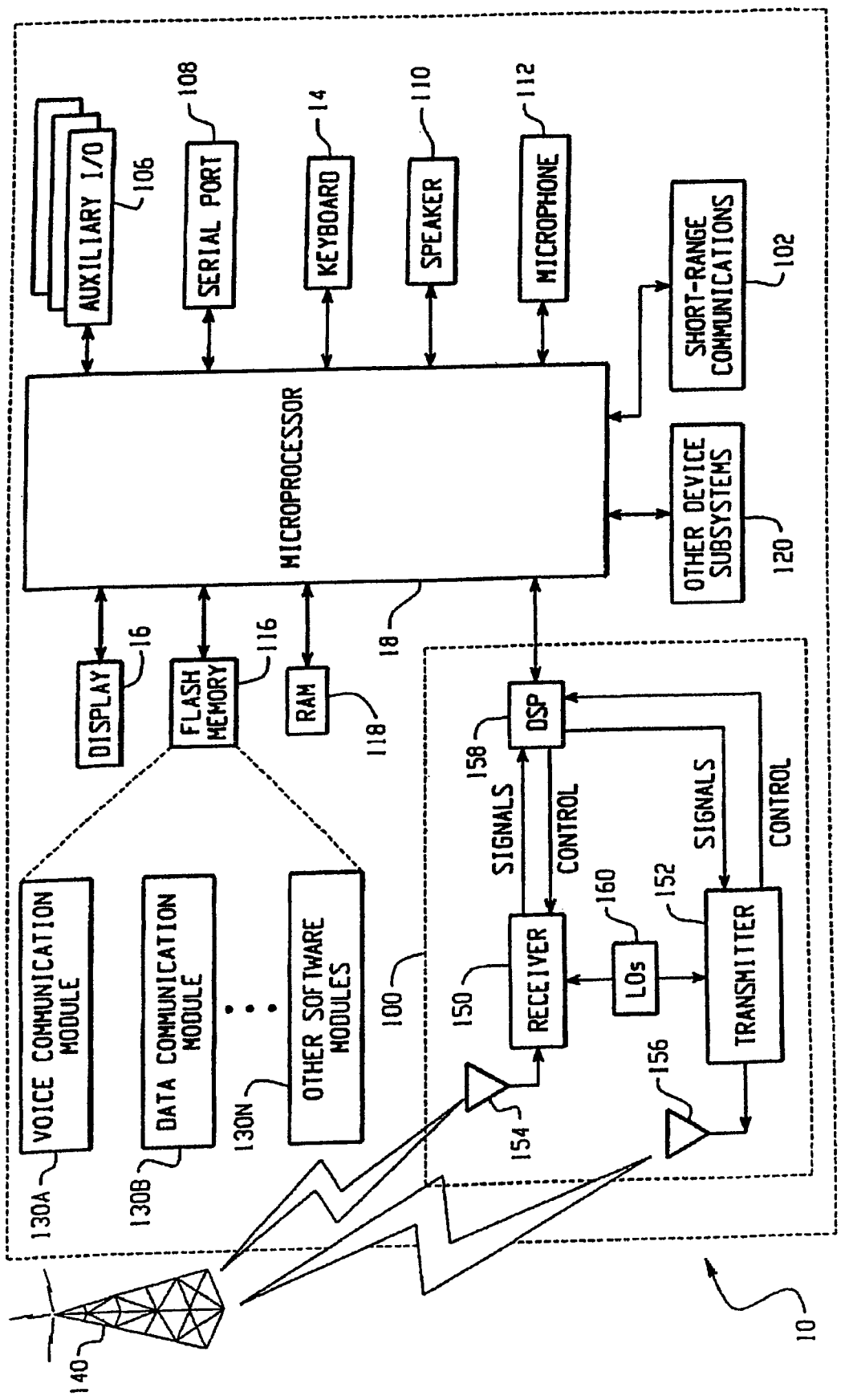
FIG. 1 is a representational schematic of a mobile communication device.

According to an embodiment, a mobile communication device is operable to receive and store messages and to define a dynamic set of received messages to comprise a message inbox. The device comprising a user input interface operable to accept a message inbox status query from a user of the device, a response interface operable to provide a non-visual response to the device user, a processing subsystem operable to initiate the non-visual response by the response interface of the device to the user in response to the user input interface accepting the message inbox status query, the non-visual response being capable of communicating one or more characteristics of the message inbox status to the user.

The user input interface of the mobile communication device may additionally provide a button located on the exterior of the device, the button being located to permit a user to readily access the button.

The button of the mobile communication device may additionally provide a multi-function button, one function of which is defined to be the message inbox status query.

The user input interface of the mobile communication device may be operable to accept a spoken message inbox status query from the user.

The mobile communication device may further be operable to receive and store messages of more than one message type, and in which the message inbox is capable of comprising a set of received messages of more than one message type.

In a further embodiment a machine readable medium comprises computer code executable on a mobile communication device, the mobile communication device being operable to receive and store messages and to define a dynamic set of received messages to comprise a message inbox, the device comprising a user input interface, a response interface, and a processing subsystem, the computer code comprising: computer code executable on the mobile device to enable the user input interface to be operable to accept a message inbox status query from a user of the device, computer code executable on the mobile device to enable the response interface to be operable to provide a non-visual response to the device user, computer code executable on the mobile device to enable the processing subsystem to be operable to initiate the non-visual response by the response interface of the device to the user in response to the user input interface accepting the message inbox status query, the non-visual response being capable of communicating one or more characteristics of the message inbox status to the user.

The user input interface of the device may additionally provide a button located on the exterior of the device, the button being located to permit a user to readily access the button and in which the computer code executable on the mobile device is operative to accept the user inbox message status query in response to the user pushing the said button.

In a further embodiment, a method of communicating one or more characteristics of a message inbox status of a mobile communication device is provided, the device being operable to receive and store messages and to define a dynamic set of received messages to comprise a message inbox, the device having a user input interface and a response interface, the method comprising: receiving, using the user input interface, a message inbox status query from the user, upon receiving the message inbox status query, initiating a non-visual response to the user, the response interface of the device consequently providing a non-visual response to the user, the non-visual response communicating one or more characteristics of the message inbox status.

The method may further provide that the response to be communicated is defined by a pre-selected user option.

Alternatively, the method may further provide that the response is one of an audible response or a vibratory response.

In a still further embodiment, a machine readable medium comprises computer code means executable on a mobile communication device for implementing a method of communicating one or more characteristics of a message inbox status of a mobile communication device, the device being operable to receive and store messages and to define a dynamic set of received messages to comprise a message inbox, the device having a user input interface and a response interface, the method comprising: receiving, using the user input interface, a message inbox status query from the user, upon receiving the message inbox status query, initiating a non-visual response to the user, the response interface of the device consequently providing a non-visual response to the user, the non-visual response communicating one or more characteristics of the message inbox status.

Figure 2:
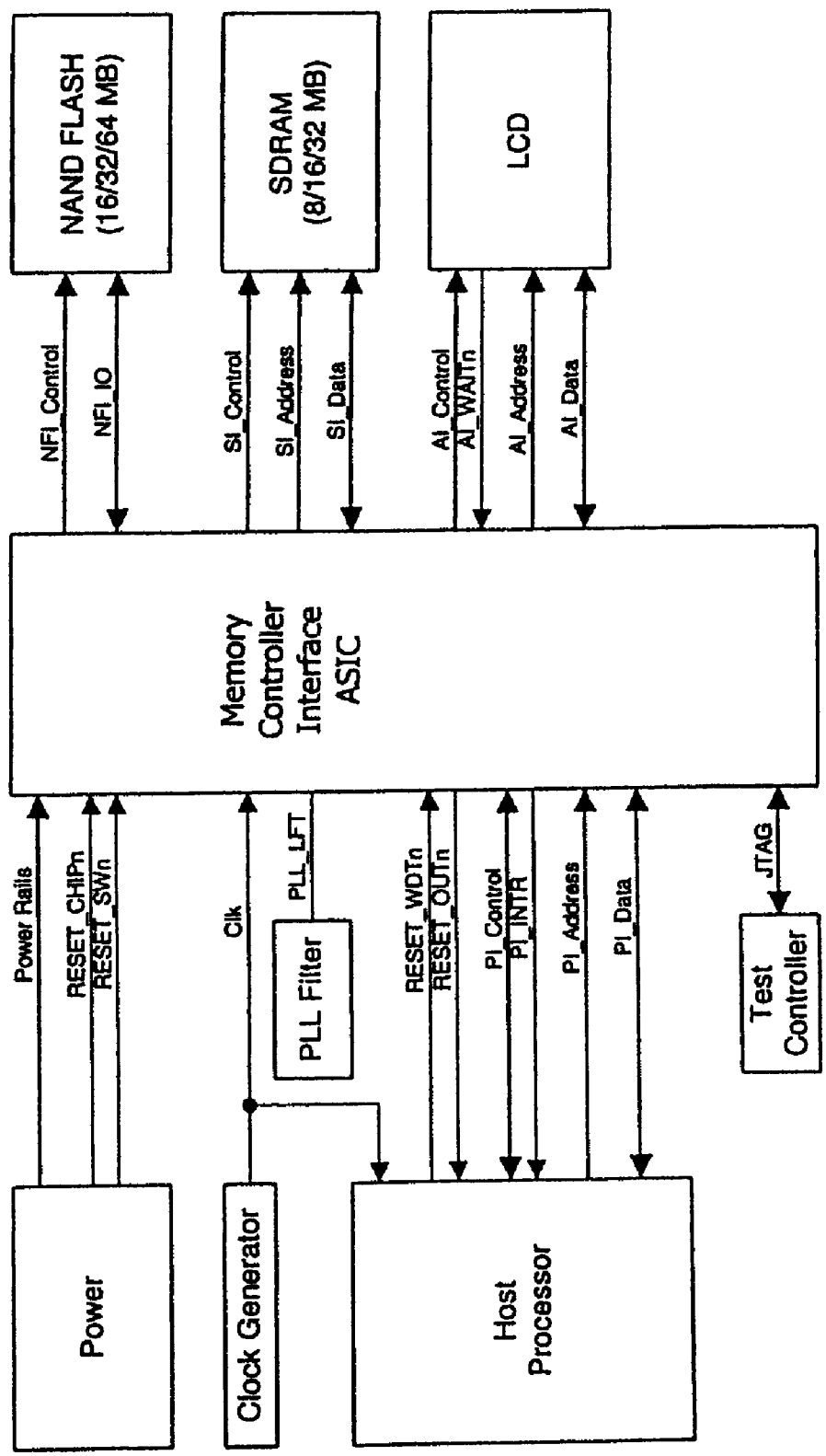
FIG. 2 is a representational schematic of a microprocessor contained within a mobile communication device.

The system and method of a preferred embodiment will be described in detail below, by way of example only, in the context of a hand-held mobile communication device as illustrated in FIG. 1 to 2. However, it will be appreciated that the principles of the invention apply to other mobile communication devices and the system is not intended to be limited thereby.

The hand-held mobile communication device 10 includes a housing, a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user. Preferably the device includes a vibration means as known in the art of mobile communication devices.

The housing may be elongated vertically, or may take on other sizes and shapes (including clamshell housing structures). The keyboard may include a mode selection key, or other hardware or software for switching between text entry and telephony entry. Additional function, power or mode selection keys may be incorporated into the sides or ends of the housing.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

In operation the mobile communication device 10 may receive messages in a variety of formats, all intended for the device's user. Often messages are received when the user of the device is not in the process of using the device. Messages are therefore stored for later review by the user. In the device operation of the preferred embodiment such messages (for example email, SMS and voicemail format messages) are initially identified in the device as being recent messages that have not been reviewed by the user.

The messaging application defines a dynamic set of received messages that have not been deleted or moved to a storage location as being held in a message inbox. Different implementations may define the message inbox in different ways. For example, the message inbox may be defined by copying or moving messages to a pre-defined data storage location in the device. Alternatively, such inbox messages may be defined by an inbox flag associated with each message or by a separate data structure which effectively indexes into the set of received messages stored on the device.

For the preferred embodiment, a set of the received messages is made identifiable as being within a message inbox by computer code executable on the device. As will be apparent, such a set of messages is dynamic: messages are added to the inbox as they are received by the device and are removed from the inbox by user actions such as deleting or moving such messages (other user actions, such as opening a message, may also remove the message from the inbox).

Typically, characteristics of the set of messages making up the inbox are of interest to the device user. In the preferred embodiment device, a messaging application calculates a count of such recent messages and displays this count on display 16. Icons may be associated with each of the different message formats and may be displayed along with a count for that message format to provide the user with a more detailed summary of the current contents of the inbox. Individual messages may be viewed in more detail by accessing individual message folders to review and access individual messages.

Upon receipt of a communication, the device 10 may alert the user to the arrival of a communication by one or more cues which are typically visual, audible or vibratory. The type of cue(s) used for each communication type may be pre-selected by the user as an option. Typically users will pre-select not to receive a cue for frequent non-real time communication types such as email or SMS messages. While cues are useful for identifying new messages received by the device, they are easy to miss and convey only limited information to the user. Furthermore a difficulty with receipt-driven cues is that they occur on receipt of a message which may not coincide with an opportune time for the user to receive a cue. In order to avoid cues from interrupting other activities, users often opt not to receive cues at all and rely solely on their inbox to alert them when a new communication has been received. By not relying on the cues, the users must repeatedly review the current contents of their inbox by viewing the visual interface display 16.

Viewing the display 16 typically requires that the user remove the device 10 from a holster, case, or pocket, possibly enter a password and direct attention to the display 16.

Further, a visual interface such as display 16 is of limited value to the visually impaired. If display 16 is the only interface provided for reviewing a summary of messages in the inbox, a visually impaired user will be effectively deprived of this functionality. Thus, in certain circumstances, it would be useful for a user to be able to determine the contents of the device inbox without having to view the display 16.

The mobile communication device of the preferred embodiment includes a user input interface that is an easy to access button available to the user for the user to make a message inbox status query which is accepted by the interface. The device further includes a response interface that is a non-visual interface activated by computer code executing on the device of the preferred embodiment to provide the user with information about inbox status in response to an inbox status query. In the device of the preferred embodiment such a non-visual interface includes an audible interface and a vibratory interface, each of which are selectable by the user as an option.

In operation, instead of viewing the display 16 in order to determine the contents of the inbox, the preferred embodiment device allows the user to simply query the device 10 and receive a non-visual summary of the contents of the inbox. The manner of initiating such a query and the form and contents of the summary may be tailored through pre-selected user options.

The query may be initiated by the user pressing a dedicated button on the housing of the device. Preferably and according to the preferred embodiment, the user may initiate a query by pressing a readily-available multi-function button on a portion of the device housing that is accessible when the device is in its holster and which is easily locatable by touch. In the preferred embodiment device, the multi-function button assumes the inbox query function when the user depresses the button for longer than a predefined time. Alternatively, the inbox query function may be assumed when the device is located in its holster.

In the device of the preferred embodiment, the message application is operable to receive the inbox status query after the user initiates the query using the interface described above. Computer code in the message application, with the appropriate hardware on which the application executes, constitutes a processing subsystem operative to carry out functions of the preferred embodiment as set out below.

The message application is operable to receive the query, and in response, to review the current contents of the inbox according to summary criteria, to generate a summary of the current contents according to the summary criteria and to communicate the summary to the user in a non-visual fashion. The summary criteria may either be fixed, or in a preferred embodiment are adjustable as a pre-selected user option. The summary criteria determine the scope of the review and summary. For instance, the review may comprise a summary review of the inbox to identify and communicate the presence of new communications present in the inbox, thus indicating to the user the need to remove the device 10 to view the display 16. Alternatively, the review may be specific with respect to the presence of a particular communication type, or a detailed review including the number of new communications of each type currently present in the inbox. The manner in which the device 10 summarizes the inbox may also either be fixed, or in a preferred embodiment is adjusted as a pre-selected user option.

In this manner a user may determine certain characteristics of the contents of the device inbox. This will permit the user, for example, to ascertain whether removal of the device 10 from its holster is required to open the received message or messages. The user may, for instance, simply press an external button and receive a response from the device 10 alerting the user that new messages are present in the device inbox. The device of the preferred embodiment is useful in situations where a user is occupied with other activities and wishes to know whether new messages have arrived, before interrupting his or her present activity to further read or listen to messages received by the device 10. For example, a user driving a car could query the device 10 for new messages. The user only needs to pull the car over to stop in order to view the display 16 if the device 10 responds that new messages are in the inbox. Similarly, a user engaged in frequent meetings may set the device 10 to suppress receipt-driven cues and set the response to an inbox status query to be provided by a vibratory interface, thus allowing the user to unobtrusively determine if a message has been received at times convenient to the user.

The above description is set out with reference to a message application. As will be appreciated by those skilled in the art, the functionality described may be achieved in hardware, software, firmware, and by a combination. Mobile communication device 10 may be configured to achieve the functionality described by computer code being downloaded to the device. In this case, computer readable media may be supplied containing computer code executable on the mobile device. A computer readable medium may include, but is not limited to, a magnetic or electronic storage device and may include a computer network such as the Internet. It is contemplated that computer readable code may be provided to a device such that when executed on the device, the functionality described will be available to the user of the device.

The device 10 may provide for an inbox status query response configuration that provides alternative options and rules to define the meaning of particular user queries and the appropriate responses generated by the messaging application operable on the device 10. The user is preferably provided with a range of communication types to be summarized and the preferred format of a response. In this manner the user may select one or more communication types to be summarized and choose the response format that best suits the selected combination of communication types and their own activities. Where a user is interested in a specific communication type, they would likely prefer a simple yes/no response to their query. Where a user is interested both in a specific communication type and the general status of the inbox, they would likely prefer the specific communication type to be summarized first, and a general summary of the inbox to follow.

For instance, the device 10 may provide for an option that allows the user to pre-set the scope of the summary in response to pressing the query button. A user expecting an important email, for instance, could set the query button to query the device 10 for new email messages. The response could also be set to a yes/no response by an appropriate communication method. Thus, the user could check for the arrival of a new message by simply pressing the query button and receiving a yes/no response from the device 10. Alternatively, the option could define the response to be positive, a beep, chirp or vibration if there is a new message in the inbox, and for no response if there is not a new message in the inbox.

Similarly, a user expecting a phone call may define a query button to equate to a request regarding new voicemail communications present in the inbox and define a particular response format for that communication. In response to the user depressing the query button, the messaging application determines the contents of the inbox and responds to the user either solely with respect to voicemail, or optionally, generally in response to the query and specifically with respect to voicemail communications.

As is set out above, preferably the query input interface comprises a query button on the exterior of the device 10 that is accessible when the device 10 is stored in a holster. The query button may either comprise a dedicated button, or alternatively may comprise a function of a multifunction button that may be set to comprise a query button when a specific condition(s) is/are met. For instance, the user could pre-select that a multifunction button acts as a query button when the device 10 is in its holster but disables the query function when the device 10 is removed from the holster. In this manner, the user could rely on the display 16 to summarize the inbox when the device 10 is removed from the holster, but could query the device 10 for an audible or vibratory summary of inbox contents when the device 10 is in its holster.

Allowing the user to pre-select options in the response configuration permits flexibility in the preferred embodiment. For instance, the device 10 may summarize the contents of the inbox through an audible response. The audible response may comprise a beep or a chirp assigned to each message format. The beep or chirp could sound once for each message of the assigned type that is present in the inbox. The response may be limited to only sound a maximum number of times for a specified, or greater, number of messages in the inbox (e.g. 5 chirps for 5 or more messages in the inbox). Alternatively the audible response may comprise a voice synthesized summary of the contents of the inbox (e.g.: "Your inbox is empty"; or alternatively, "You have 1 voicemail message, and 1 email message in your inbox").

Alternatively, the device 10 may summarize the contents of the inbox through a vibratory response in response to the query. Optionally, different types of vibration may be used for each message type.

In addition to the communication format of the response, the user may also select how the device summarizes the contents of the inbox. For example, the device may provide a yes/no response to the query. This setting for the preferred embodiment would be useful, for instance, where the user's query was specific to a particular type of message and the response is directed to whether or not a new message of that type was present in the inbox. The option to provide only a yes/no response may either be pre-selected by the user as the response type to give when a query is received by the device 10, or it could be implemented as an additional dedicated button or dedicated function of a multi-function button. For example, the user could press and hold the query button in order to receive a yes/no response. The response could either be global, i.e. is there something new in the inbox, or else a specific message type could be pre-selected as an option. Alternatively, the query button/function selected by the user could specify the message type being queried for a yes/no summary.

The device 10 may include a messaging application which is operable on the device 10 to carry out the functions described or it may include a specific response application that is executable on the device 10 to wait for specific inbox status query input from the user. The response application may be a background application running on the device 10, or a response application called by the messaging application that manages the inbox.

Figure 3:
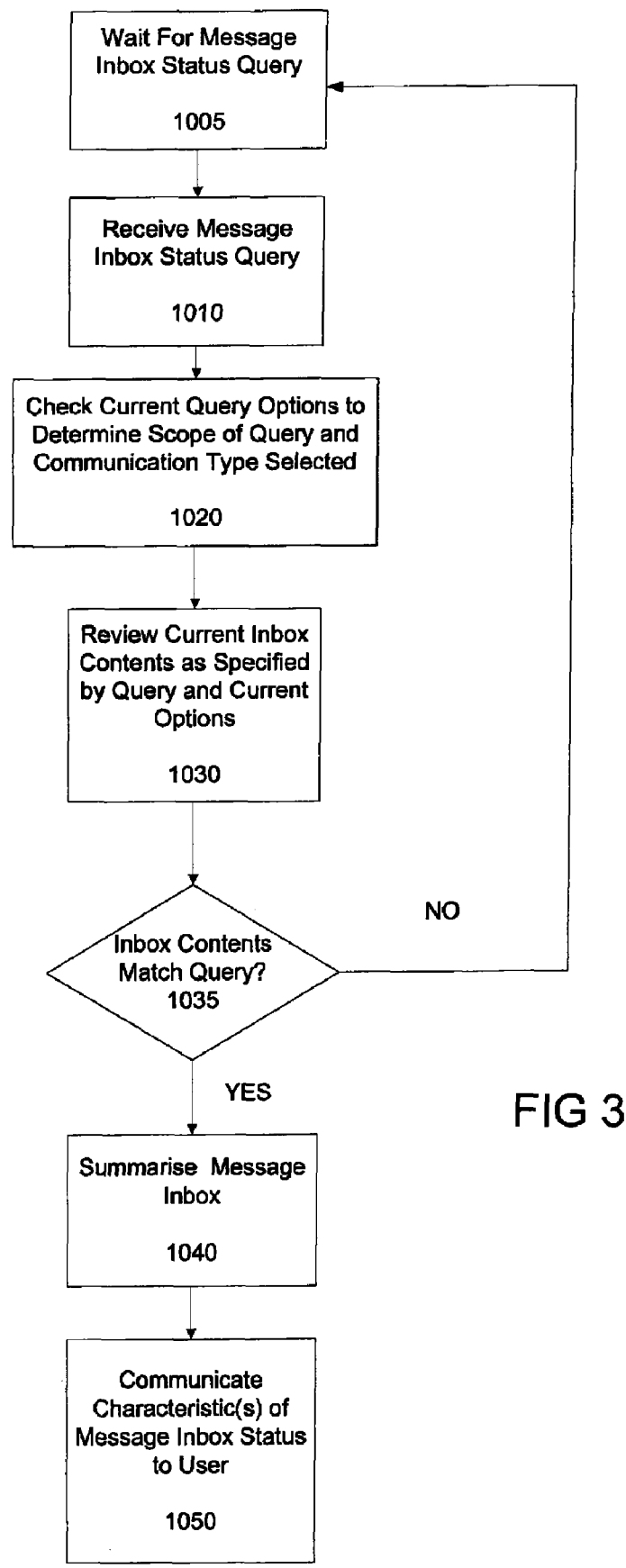
FIG. 3 is a flowchart depicting operation of a response application to summarize the contents of an inbox, according to a preferred embodiment.

Operation of an embodiment of a response application is summarized in the flow chart of FIG. 3. The response application waits for an inbox status query from a user 1005. Upon receipt of a query input from the user 1010, the response application checks the current query options 1020 to determine the scope of the query requested by the input, and the communication format the device is to use to communicate the summary to the user. The response application then reviews the current inbox contents as specified by the type of query requested by the input and the current options 1030. The response application compares the current inbox contents with the specified query to determine if any inbox contents match the query 1035. If inbox contents match the query, the response application summaries the contents of the inbox queried 1040 to form a response in accordance with the query options. If the inbox contents do not match the query, the response application returns to wait for a new inbox status query 1005 and, depending upon the current options, the application may communicate a negative response to the user. Depending upon the query type, the step of forming a response may comprise combining inbox counts for different message types, or checking for the presence of a particular message type in the inbox. The response application then communicates the response to the user using the pre-selected communication format 1050. Thus, in response to the query the device 10 communicates the contents of the inbox to the user in a non-visual fashion.

While the query mechanism has been described in terms of a button, it could also be conveyed by means of a spoken query from the user, or a combination of a button and spoken query where either more information is required from the user or the user is using a wireless headset. In this case, the device 10 may be equipped with voice recognition software and the user may query the device 10 with such a spoken request.

Typically, wireless headsets comprise an earpiece incorporating a microphone and an activation button. When a user wishes to make a call, the user presses the activation button and, if voice recognition software is running on the device, verbally request a call be made to a number, or a specific address entry in the device address book. Thus, since the user need not physically touch the device, the device is often located in an inside pocket, a briefcase, handbag, or other location that is relatively inaccessible for viewing the display.

Use of a headset permits interrogation of the inbox without having to remove the device from its location. A user queries the device by pressing the activation button and orally requesting an inbox summary. In response to the request, the device summarizes the contents of the inbox according to one of the methods previously described.

The systems and methods disclosed herein are presented only by way of example and are not meant to limit the scope of the invention. Other variations of the systems and methods described above will be apparent to those skilled in the art and as such are considered to be within the scope of the invention.

For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) and data signals that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights rights whatsoever.

I claim:

1. A mobile communication device, comprising:
   a user input interface;
   a non-visual response interface;
   a communications subsystem; and
   a processing subsystem in operable communication with the user input interface, the non-visual response interface, and the communications subsystem, the processing subsystem being configured to:
   selectively place the mobile communication device in a first device state when the mobile communication device is stored, or in a second device state when the mobile device is not stored, the processing subsystem being configured to be responsive to a query received via the user input interface in the first state, and unresponsive to the query in the second state;
   receive a selection via the user input interface, the selection being configured to suppress presentation of non-visual cues by the non-visual response interface upon message receipt;
   receive, via the communications subsystem, a message in a message inbox of the mobile communication device, the message inbox containing more than one message type;
   while the mobile communication device is in the first device state, receive the query via the user input interface; and
   communicate, in response to the query, despite receipt of the selection regarding suppression of non-visual cues a non-visual response to a user via the non-visual response interface, the non-visual response being configured to indicate contents of the message inbox with a single non-visual summary that distinguishes between message types.

2. The mobile communication device of claim 1, wherein the mobile communication device being stored comprises the mobile communication device being contained in a carrier.

3. The mobile communication device of claim 1, wherein the mobile communication device being stored comprises the mobile communication device being contained in a holster.

4. The mobile communication device of claim 1, wherein the more than one message type includes at least one of email, text messages, and voicemail.

5. The mobile communication device of claim 1, wherein the non-visual response interface comprises a speaker and the non-visual response is an audible response.

6. The mobile communication device of claim 5, wherein the non-visual response comprises a beep or a chirp.

7. The mobile communication device of claim 5, wherein the non-visual response is a voice-synthesized response.

8. The mobile communication device of claim 1, wherein the non-visual response interface comprises a vibratory response interface and the non-visual response is a vibratory response.

9. The mobile communication device of claim 1, wherein the query is an oral query.

10. The mobile communication device of claim 9, wherein the query is received using a wireless headset in communication with the mobile communication device.

11. The mobile communication device of claim 1, wherein the mobile communication device being stored comprises the mobile communication device being holstered and the mobile communication device not being stored comprises the mobile communication device not being holstered.

12. The mobile communication device of claim 1, wherein the user input interface is associated with the query in the first device state, and is associated with a different function in the second device state.

13. The mobile communication device of claim 1, wherein the query is predefined, and the processing subsystem is further configured to generate the non-visual response by:
   in response to receipt of the query,
      review the message inbox;
      determine that contents of the message inbox match the query; and
      upon the determination, generate the non-visual response.

14. The mobile communication device of claim 1, wherein the processing subsystem is further configured to:
   in response to a further, predefined query received via the user input interface,
      review the message inbox;
      determine that contents of the message inbox match the further, predefined query; and
      upon the determination, generate a further non-visual response to a user for communication via the non-visual response interface, the further non-visual response representing a summary of the message inbox contents.

15. A method implemented at a mobile communication device, the method comprising:
- selectively placing the mobile communication device in a first device state when the mobile communication device is stored, or in a second device state when the mobile device is not stored, the processing subsystem being configured to be responsive to a query received via a user input interface of the mobile communication device in the first state, and unresponsive to the query in the second state;
- receiving a selection via the user input interface, the selection being configured to suppress presentation of non-visual cues by the non-visual response interface upon message receipt;
- receiving a message in a message inbox of the mobile communication device, the message inbox containing more than one message type;
- while the mobile communication device is in the first device state, receiving the query via the user input interface; and
- communicate, in response to the query, despite receipt of the selection regarding suppression of non-visual cues, a non-visual response to a user via a non-visual response interface of the mobile communication device, the non-visual response being configured to indicate contents of the message inbox with a single non-visual summary that distinguishes between message types.

16. The method of claim 15, wherein mobile communication device being stored comprises the mobile communication device being contained in a carrier.

17. The method of claim 15, wherein the mobile communication device being stored comprises the mobile communication device being contained in a holster.

18. The method of claim 15, wherein the more than one message type includes at least one of email, text messages, and voicemail.

19. The method of claim 15, wherein the non-visual response interface comprises a speaker and the non-visual response is an audible response.

20. The method of claim 19, wherein the non-visual response comprises a beep or a chirp.

21. The method of claim 19, wherein the non-visual response is a voice-synthesized response.

22. The method of claim 15, wherein the non-visual response interface comprises a vibratory response interface and the non-visual response is a vibratory response.

23. The method of claim 15, wherein the query is an oral query.

24. The method of claim 23, wherein the query is received using a wireless headset in communication with the mobile communication device.

25. The method of claim 15, wherein the mobile communication device being stored comprises the mobile communication device being holstered and the mobile communication device not being stored comprises the mobile communication device not being holstered.

26. The method of claim 15, wherein
- the user input interface is associated with the query in the first device state, and is associated with a different function in the second device state.

27. The method of claim 15, wherein the query is predefined, the method further comprising generating the non-visual response by:
- in response to receipt of the query,
  - reviewing the message inbox;
  - determining that contents of the message inbox match the query; and
  - upon the determining, generating the non-visual response.

28. The method of claim 15, further comprising:
- receiving a further, predefined query via the user input interface;
- in response to receipt of the further, predefined query,
  - reviewing the message inbox;
  - determining that contents of the message inbox match the further, predefined query; and
  - upon the determining, generating a further non-visual response to a user for communication via the non-visual response interface, the further non-visual response representing a summary of the message inbox contents.

29. A computer program product comprising a non-transitory computer readable medium comprising computer code executable on a mobile communication device, the computer code being executable to cause the mobile communication device to:
- selectively place the mobile communication device in a first device state when the mobile communication device is stored, or in a second device state when the mobile device is not stored, the processing subsystem being configured to be responsive to a query received via a user input interface of the mobile communication device in the first state, and unresponsive to the query in the second state;
- receive a selection via the user input interface, the selection being configured to suppress presentation of non-visual cues by the non-visual response interface upon message receipt;
- receive, via a communications subsystem, a message in a message inbox of the mobile communication device, the message inbox containing more than one message type;
- while the mobile communication device is in the first device state, receive the query via the user input interface; and
- communicate, in response to the query, despite receipt of the selection regarding suppression of non-visual cues, a non-visual response to a user via a non-visual response interface of the mobile communication device, the non-visual response being configured to indicate contents of the message inbox with a single non-visual summary that distinguishes between message types.

* * * * *